United States Patent [19]

Schornhorst

[11] 3,915,684

[45] Oct. 28, 1975

[54] CONTINUOUS CHANGE OF GLASS COMPOSITION IN A GLASSMAKING PROCESS

[75] Inventor: James R. Schornhorst, Pittsburgh, Pa.

[73] Assignee: PPG Industries, Inc., Pittsburgh, Pa.

[22] Filed: Apr. 16, 1974

[21] Appl. No.: 461,317

[52] U.S. Cl. .................. 65/134; 65/135; 65/136; 65/167; 106/52
[51] Int. Cl.² ........................................... C03B 5/16
[58] Field of Search ............ 65/134, 135, 136, 167; 106/52

[56] References Cited
UNITED STATES PATENTS

| | | | |
|---|---|---|---|
| 3,127,262 | 3/1964 | Allman | 65/134 |
| 3,231,357 | 1/1966 | Pither | 65/134 X |
| 3,265,485 | 8/1966 | Carney et al. | 65/134 |
| 3,558,297 | 1/1971 | Carney et al. | 65/134 |
| 3,627,504 | 12/1971 | Johnson et al. | 65/135 X |
| 3,836,349 | 9/1974 | Knavish | 65/134 |

*Primary Examiner*—S. Leon Bashore
*Assistant Examiner*—Frank W. Miga
*Attorney, Agent, or Firm*—E. Kears Pollock

[57] ABSTRACT

The composition of glass being produced from a glassmaking furnace is changed without completely draining and refilling the furnace by reducing glass production, then removing or draining molten glass from the furnace while continuing to feed glassmaking materials to it and making periodic changes in the composition of those glassmaking materials, and then when the glass is sufficiently changed in composition, increasing glass production again. The rate of glass composition change is enhanced by establishing thermal conditions in the glassmaking furnace which cause the molten glass to circulate to the location of glass removal.

6 Claims, No Drawings

3,915,684

CONTINUOUS CHANGE OF GLASS COMPOSITION IN A GLASSMAKING PROCESS

BACKGROUND OF THE INVENTION

1. Field of the Invention

This invention relates to continuous glass manufacture, in particular the manufacture of flat glass. More particularly, it relates to methods for continuously changing from one glass composition to another without draining all glass from a glassmaking furnace.

2. Brief Description of the Prior Art

In continuous glassmaking processes, it has long been known that the composition of glass being produced may be changed either by draining and refilling a glassmaking furnace or by periodically changing the composition of glassmaking materials being fed to the furnace while continuing to produce glass (which, of course, is a continuous removal of glass from the furnace).

It has been known to adjust or change the composition of the glassmaking materials fed to a furnace in a manner to overcompensate for an ingredient being changed at the beginning of a period of change and thereafter adjust its amount to its final desired amount. This, as would be expected from the dynamics of fluid systems is a way to hasten a change of composition. U.S. Pat. No. 2,900,264 to Brown relates to this kind of procedure.

It has also been known to heat glassmaking furnaces well above their normal operating temperatures before and during composition changes. This is to thoroughly melt and fluidize glass adjacent the common refractory walls and bottom of a glassmaking furnace and to generally agitate and mix the incoming glass of changed composition with the resident glass having the prior, undesired composition. This practice, while providing for thorough purging of a glassmaking furnace, presents several drawbacks.

Among the drawbacks of this common practice are the following effects: The thermal patterns and conditions in the furnace are disrupted and must be re-established following a composition change. The refractories of which the furnace is constructed are heated to undesirably high temperatures which have an adverse effect on the life of the refractories. The thorough mixing of glasses of different compositions yields glass having compositions ranging widely within the range of compositions between the initial and final composition. This makes difficult the segregation and use of such glass as cullet.

The present invention provides an improved method for continuously changing glass composition in a glassmaking process.

SUMMARY OF THE INVENTION

According to known practice, the composition of batches of glass-making materials fed to a glassmaking furnace are periodically changed and glass is continuously removed from the furnace. In conjunction with this practice the rate of glass production is reduced. This is followed by removing or draining molten glass from the glassmaking furnace at a location other than the usual location of removal or discharge for forming. Following this, the separate glass removal is terminated and glass production is again increased.

During the separate molten glass removal, thermal conditions are established and maintained in the glassmaking furnace which cause a circulating flow of molten glass in the pool of molten glass within the furnace. Two major circulation flows are established by heating the melter and cooling the refiner. One is in the melter region of the furnace and one is in the refiner or conditioning region of the furnace. A region of upward flow is established at the juncture of these two circulating flows. This upward flow is what is known as "spring zone" flow. The separate molten glass removal is accomplished between the spring zone or upward flow location and the discharge end of the furnace where glass is discharged for forming. The separate glass removal removes glass from the downstream circulating flow, that is, the refiner flow. This results in thorough purging of the furnace while the glass initially removed has a composition sufficiently like the composition being replaced to be saved for use as cullet in such future compositions. The glass removed thereafter has a composition suitable for use as cullet in the compositions to which glass production is being changed. No removed glass need be lost for use as cullet. The initial composition lasts for about 40 to 60 percent of the change time. The composition is preferably monitored during the change to assist in proper segregation of removed glass.

In one preferred embodiment the production of glass is stopped entirely during the change. This permits repair of forming facilities during the period of change. With the glass removal due to discharge for forming stopped, the only glass removal during such a composition change is by draining.

The composition changes contemplated in the practice of this invention are primarily changes to cause a change in the color or other property of glass being made. The color may be changed to achieve differing esthetic effects or to change the heat or radiation transmission characteristics of the glass. In general, a limited number of the constituents in the glass will have their amounts changed. Constituents may be added to glass to cause it to have phototropic behavior to cause it to absorb gamma radiation or the like. In most composition changes the base glass composition will remain substantially unchanged, that is, for example, a borosilicate glass will not usually be substituted for a soda-lime-silica glass by making continuous or periodic changes in the composition of glass batch fed to a furnace.

Commonly used constituents which are changed to effect changes in glass composition are metal oxides, such as, for example, iron oxide, cobalt oxide, nickel oxide or copper oxide and metals including, for example, arsenic, selenium, silver, gold, tin, antimony or lead. One of the constituents or ingredients to be changed in any glass composition change is designated the principal or key ingredient. The change in composition is controlled according to the changing content of the key ingredient. Preferably, the key ingredient is one that is easily and precisely detected by rapid conventional analysis, such as, for example, X-ray fluorescence or the like.

During a composition change, the time of reduced glass discharge and of supplemental molten glass removal is preferably a sufficient time to allow the amount of the key ingredient in the glass in a furnace in the vicinity of or adjacent to the location of discharge to reach an amount representing at least 75 percent of the desired change. It is even more preferred to extend this time to be sufficient to permit the key ingredient to reach an amount representing at least 90 percent of the desired change. The amount of the key ingredient in the glass at the time sufficient to cease supplemental glass removal may be represented as follows:

$$A = P (A_{final} - A_{initial}) + A_{initial}$$

where
- $A$ is the amount of the key ingredient in the glass when supplemental glass removal may be stopped; expressed in percent or fractional amount;
- $P$ is the fractional extent of desired change, either 0.75 representing 75 percent or 0.9 representing 90 percent;
- $A_{final}$ is the amount of the key ingredient in the final composition; and
- $A_{initial}$ is the amount of the key ingredient in the initial composition.

The separate glass removal may be at a location near the spring zone in order to remove glass from the bottom of the refiner which is flowing rearwardly from the region of discharge toward the spring zone. This procedure purges the bottom of the refiner and aids in the removal of dense impurities that can build up on the bottom of a refiner. Alternatively, the separate glass removal may be near the discharge region to remove glass of the initial composition quickly from the upper portion of the pool so that discharge for forming may be resumed at a higher rate in a shorter changeover time. A combination of these separate glass removal steps may be employed. For example, early in a changeover a spring zone removal may be used and then a discharge region removal initiated prior to resuming normal glass discharge.

It is preferred during glass composition changes that the level of the molten glass in the furnace remain substantially unchanged. By maintaining the level of the molten glass, dissolution and erosion of the refractory basin walls of the furnace are minimized.

When changing the composition of glass in a furnace from one that is highly heat absorbing to one that is not, the rate of change can be substantially increased by removing glass first near the surface of the pool of molten glass and later as the changeover progresses from successively deeper drains. In an overhead heated furnace, such as a common recuperator or regenerator furnace, the glass near the surface absorbs heat in the melter and re-radiates it in the refiner if the glass composition is one that has a high heat absorptivity. The glass beneath the surface is thus deprived of heat and remains relatively cold and viscous, making its flow and removal from the furnace difficult.

By first removing highly heat-absorptive glass from near the surface of the pool and replacing it with less heat-absorptive glass heat from flames above the glass can better penetrate or be transmitted to the glass in the bottom of the furnace. This glass then becomes hotter and becomes more flowable. As glass is removed from successively lower or deeper drains, this heat-absorptive glass quickly and easily flows from the furnace.

This multi-depth drain technique is particularly useful when changing the composition of glass in a furnace from one containing sufficient iron oxide (in either the ferrous or ferric state) to make it blue or green and heat absorbing to a clear glass containing little or no iron oxide. For example, when changing from a heat-absorbing glass, such as SOLEX heat-absorbing glass as sold by PPG Industries, Inc., Pittsburgh, Pa., to clear glass, this technique can shorten the changeover of a nominal 400 ton-per-day furnace by a day or more.

It is usually desirable to employ drains that are in side walls or kilns extending outwardly from the sides of a furnace. These locations are accessible and molten glass flow is more easily monitored and controlled at such locations than it would be from a bottom drain if such were employed. From a process standpoint a bottom drain in the return flow region of a furnace refiner would be desirable but ease of control and convenience make the use of side wall drains more practical.

This invention may be further understood from the following example:

The composition of glass being melted, refined and discharged to a float forming bath is to be changed from a heat-absorbing composition to a clear composition. The initial and final compositions are the same except for iron content. The initial composition contains 0.56 percent iron and the final composition contains 0.08 percent iron. An intermediate composition contains 0.03 percent iron. The basic composition is shown below.

| Constituent | Initial |
|---|---|
| | (Percent by Weight) |
| $SiO_2$ | 72.93 |
| $Na_2O$ | 13.63 |
| $K_2O$ | 0.02 |
| CaO | 8.64 |
| MgO | 3.80 |
| $Al_2O_3$ | 0.12 |
| $SO_3$ | 0.23 |
| $Fe_2O_3$ | (changed) |

Iron oxide ($Fe_2O_3$) is the key ingredient. Its intermediate amount is the trace amount present in the sand that is used. Its final amount is just enough more than the trace amount so that control may be exercised.

The furnace employed contains about 1200 tons of glass.

The changeover is initiated by feeding intermediate composition batch to the furnace. This continues until the color of the glass being produced reaches its tolerable limit for proper color. This occurs after about 12 hours when producing glass at a rate of about 400 tons per day. Then the discharge of molten glass to the forming chamber is stopped and draining initiated while batch feeding of intermediate batch continues. The level of the pool of glass in the furnace is maintained. Draining is commenced from a drain located in a skim kiln or "dog house" just upstream of the waist separating the melter from the refiner of the furnace. The drain is about 6 inches beneath the surface of the glass. Draining begins at about 15 tons per hour. The melter is fired during this time to heat the melter to maintain the rate of melting batch and to maintain the necessary thermal patterns to continue the circulating flow in the furnace. Submerged coolers in the bottom of the refiner near its upstream end are removed to increase the circulation rate and cooling is continued at the discharge end of the refiner for the same reason.

After about one hour draining is commenced from a drain about 17 inches beneath the surface of the glass. After about 2 days from the introduction of intermediate batch, draining is commenced from a drain about 43 inches beneath the glass surface. The draining continues as batch having the final composition is fed to the furnace. After about one more day the glass at the discharge location of the furnace reaches the desired final composition except for iron content which has reached more than 90 percent of its change. Glass discharge is resumed. Shortly thereafter the glass composition at the drain reaches the final composition and draining is stopped.

In a further example this invention may be employed to change the base glass composition although this is less common than colorant changes.

The initial glass composition is like that in the previous example. The final composition contains more soda and less calcia than the initial composition. Two intermediate compositions are employed. The two intermediate compositions (called Change-1 and Change-2) and the final composition follow:

| Constituent | Change-1 | Change-2 | Final |
|---|---|---|---|
| | (Percent by Weight) | | |
| $SiO_2$ | 64.86 | 69.24 | 71.40 |
| $Na_2O$ | 19.40 | 17.40 | 15.65 |
| $K_2O$ | 0.81 | 0.43 | 0.24 |
| CaO | 6.68 | 6.52 | 7.16 |
| MgO | 4.10 | 4.00 | 3.96 |
| $Al_2O_3$ | 3.80 | 2.05 | 1.20 |
| $SO_3$ | 0.27 | 0.33 | 0.31 |
| $Fe_2O_3$ | 0.03 | 0.03 | 0.08 |

The procedure of the previous example is carried out on a furnace of similar size and throughput. Change-1 composition batch is fed to the melter. After about 12 hours glass discharge for forming is stopped and draining begins. The furnace is permitted to heat above normal operating temperatures about 100°F. though no severe boilup is permitted. Circulating flows are maintained.

About an hour after separate glass removal is initiated, Change-2 composition batch is fed to the melter, replacing Change-1 composition batch. This batch is fed and draining continued until about 26 hours after feeding of Change-1 composition batch began. The final batch, except containing only 0.03 percent iron oxide, is fed and draining continued until about 156 hours after feeding of Change-1 composition batch began. Then the final batch composition is fed to the furnace. The separate glass removal or draining is then stopped and normal glass discharge for forming is resumed.

Although this invention has been described with reference to a particular embodiment for the purpose of illustration, those skilled in the art of glassmaking will recognize that this illustrative embodiment does not limit the scope of this invention.

I claim:

1. In the method of changing the composition of glass contained as a pool of molten glass in a glassmaking furnace wherein the glassmaking furnace comprises a melter having a feed region for receiving glass batch and an outlet region remote from the feed region and a refiner connected to the melter at its outlet region and having an inlet region adjacent such connection and a discharge region remote from the inlet region for discharging molten glass for forming; and wherein molten glass is removed from the glassmaking furnace and glass batch having changed composition is fed to the furnace during the change of glass composition from an iron oxide-containing heat absorbing composition to a composition containing sufficiently little iron oxide so as to be clear glass; the improvement comprising:
   a. reducing the rate at which molten glass is discharged from the refiner;
   b. heating the molten glass sufficiently in the melter while cooling the molten glass sufficiently in the refiner to establish and maintain a circulating flow of molten glass in the pool with such circulating flow providing a region of upward glass flow substantially adjacent the outlet region of the melter and the inlet region of the refiner;
   c. removing molten glass from the circulating glass in the glassmaking furnace at a location between the region of upward glass flow and the discharge region, first substantially adjacent the surface of the pool of molten glass and then at a succeeding deeper location; and thereafter
   d. increasing the rate at which molten glass is discharged from the refiner and ceasing said removal of molten glass from the circulating glass.

2. The method according to claim 1 wherein in said step of reducing the rate of molten glass discharge the rate of molten glass discharge is reduced until it is stopped.

3. The method according to claim 1 wherein the level of the upper surface of the pool of molten glass is maintained substantially unchanged throughout.

4. The method according to claim 1 wherein in said step of removing molten glass the molten glass is removed from locations above the bottom of the glassmaking furnace.

5. The method according to claim 1 wherein in said step of removing molten glass the molten glass is removed from a location substantially adjacent the region of upward glass flow.

6. The method according to claim 1 wherein in said step of removing molten glass the molten glass is removed from a location substantially adjacent the discharge region.

* * * * *